United States Patent
Eisenegger

[15] 3,687,272
[45] Aug. 29, 1972

[54] ELEVATOR, ESPECIALLY FOR THE VERTICAL CONVEYING OF GRANULAR OR PULVERULENT MATERIALS

[72] Inventor: Edwin B. Eisenegger, St. Gallen, Switzerland

[73] Assignee: Gerbruder Buhler AG, Uzwil, Switzerland

[22] Filed: Dec. 10, 1970

[21] Appl. No.: 96,847

[30] Foreign Application Priority Data

Dec. 15, 1969   Switzerland..............18602/69

[52] U.S. Cl.................................................198/168
[51] Int. Cl.............................................B65g 19/14
[58] Field of Search........................198/55, 140, 168

[56] References Cited

UNITED STATES PATENTS 2,618,374   11/1952   Rahlson..................198/140 X
2,767,825   10/1956   Welch........................198/168

FOREIGN PATENTS OR APPLICATIONS 575,329   7/1924   France......................198/140
190,259   12/1966   U.S.S.R......................198/168

*Primary Examiner*—Edward A. Sroka
*Attorney*—Toren & McGeady

[57] ABSTRACT

There is disclosed an elevator construction, especially for vertically conveying granular or pulverulent materials, wherein at least one endless conveying member with entrainment elements for the material secured thereto is continuously conveyed and passes through a conveying path surrounded by a conveying shaft or chute, over the upper end of which there is arranged an ejection hood or the like. According to the invention, the entrainment elements are constructed to possess a substantially funnel-shaped configuration, are open at both the top and bottom, and wherein the cross-section of each entrainment element, viewed in the direction of material conveying, widens at all sides. Further, the width of the ejection hood measured transverse to the direction or path of movement of the conveying member is greater than the width of the conveying shaft or chute.

8 Claims, 7 Drawing Figures

PATENTED AUG 29 1972 3,687,272
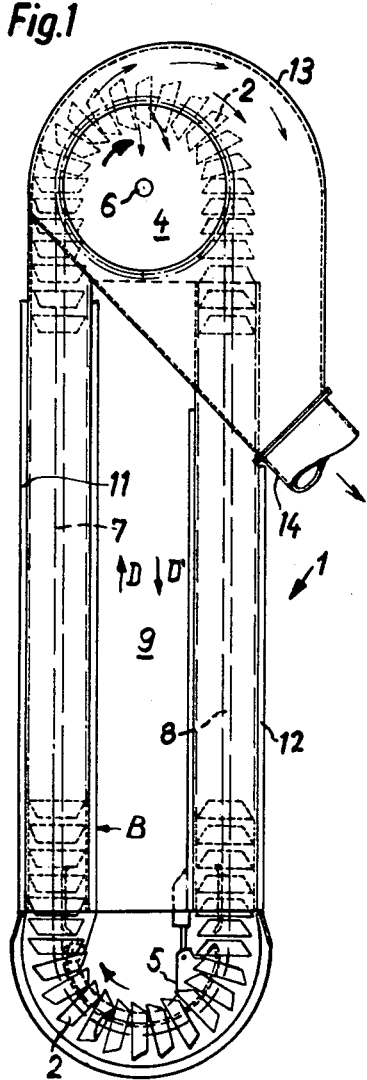
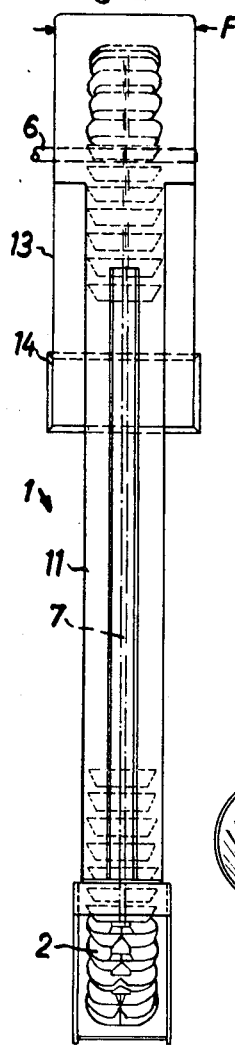
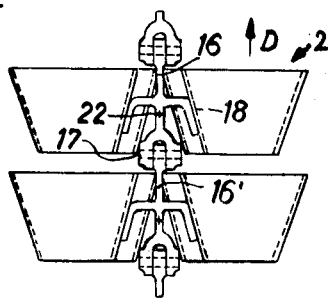
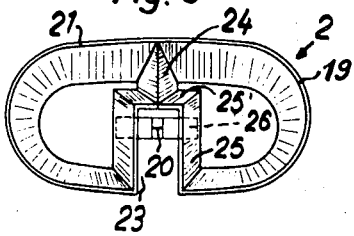
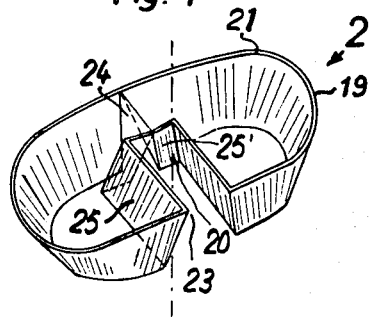
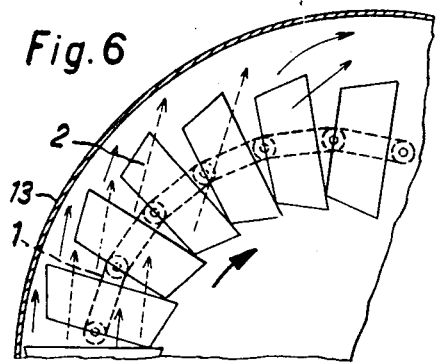
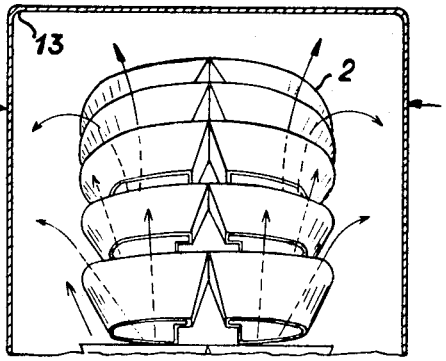
INVENTOR.
EDWIN B. EISENEGGER
BY Torem and McGeady
ATTORNEYS

ELEVATOR, ESPECIALLY FOR THE VERTICAL CONVEYING OF GRANULAR OR PULVERULENT MATERIALS

BACKGROUND OF THE INVENTION

The present invention relates to material conveying equipment and, more specifically, concerns a new and improved elevator, particular for the vertical conveying of granular or pulverulent materials, and which is of the type embodying at least one endless conveying member equipped with entrainment elements for the conveyable material attached thereto, this endless conveying member together with the entrainment elements being continuously moved and passing through a conveying or feed path surrounded by a conveying shaft or chute means, above the upper end of which there is arranged an ejection hood for the conveyed material.

Now, elevator constructions are already known to the art which are of the type where entrainment elements are arranged at the outside of an endless conveying member, these entrainment elements being in the form of buckets or scoops which are closed at their bottom end. This type of prior art proposal, however, has not been found to operate satisfactorily, especially owing to its rather small material conveying capacity. In actual practice, limits are placed upon the size of the buckets or scoops, the spacing of such buckets from one another and the feed or conveying velocity which, in turn, limit the economies, efficiency and maximum conveying height of the equipment.

In the case of other prior embodiments of elevators, the material conveying capacity is insufficient owing to the fact the degree of emptying of the conveyed material is much too small. This negative attribute of such prior art equipment often-times can be attributed to the fact that there is present an ejection cone which is likewise too small. As a result, the particles of the conveyed material tend to hinder one another, and moreover, are subject to numerous collisions and impact with the walls of the equipment, again resulting in an undesirable increase in the degree of damage to the conveyed material. These drawbacks are particularly discernable during high conveying speeds.

SUMMARY OF THE INVENTION

Accordingly, there is still present a real need in the art for material conveying equipment which is not associated with the aforementioned drawbacks of the prior art constructions. Hence, a primary objective of the present invention relates to the provision of improved type of material conveying equipment which is not associated with the aforementioned drawbacks of the prior art and which fulfills the existing need quite capably and reliably.

Another and more specific object of the present invention strives to provide an elevator construction possessing a relatively low inherent weight, energy and spatial requirements, and which also at high conveying speeds provides a large ejection cone for the material and a small proportion of damaged material.

Still a further significant object of the present invention relates to elevator equipment for conveying granular or pulverulent materials in an efficacious, reliable and protective manner, capable of operating at increased conveying speeds and with increased output.

Another important object of the present invention concerns itself with an improved construction of elevator for conveying granular or pulverulent materials of all types, which elevator is relatively simple in construction, extremely reliable in operation, robust, not readily subject to breakdown or malfunction, easy to service and relatively inexpensive to fabricate.

Now, in order to implement these and still further objects of the invention, which will become more readily apparent as the description proceeds, the elevator construction of the present invention contemplates that the entrainment elements are in the form of substantially funnel-shaped members which are open at both the top and bottom thereof. Additionally, the cross-section of each entrainment element, viewed in the direction of conveying of the material, widens to all sides, and the width of the ejection hood measured in a direction substantially transverse to the conveying or movement direction for the material is greater than the width of the conveying shafts or chute means.

The funnel-shaped configuration of the entrainment elements open at the top and bottom and the greater width of the ejection hood measured in a direction transverse to the conveying direction for the material cooperate with one another in such a way, that particularly during increased or high operating or conveying speeds, the ejection cone widens, the degree of emptying of the material being conveyed and therefore also the conveying output or capacity increases and the amount of damaged or spoiled conveyable material decreases.

BRIEF DESCRIPTION OF THE DRAWING

The invention will be better understood and objects other than those set forth above, will become apparent when consideration is given to the following detailed description thereof. Such description makes reference to the annexed drawing wherein:

FIG. 1 is a schematic front view of a preferred embodiment of elevator equipped with an ejection hood, but however, depicted without the support structure, drive unit and bottom or base housing or box;

FIG. 2 is a side view of the elevator depicted in FIG. 1 as viewed in the direction of the arrow A thereof;

FIG. 3 is an enlarged top plan view of an entrainment element used in the elevator construction of FIGS. 1 and 2;

FIG. 4 is a perspective view of the entrainment element of FIG. 3;

FIG. 5 is an enlarged side view of a detail of the conveying or transport member used in the arrangement of elevator depicted in FIG. 1;

FIG. 6 is an enlarged view of a detail of the elevator construction of FIG. 1; and FIG. 7 is a detail on an enlarged scale of a portion of the elevator construction as depicted in FIG. 2.

DETAILED DESCRIPTION OF THE PREFERRED EMBODIMENT

Describing now the drawing, in FIG. 1 there has been illustrated enough of the structure of the preferred embodiment of inventive elevator to enable one skilled in the art to fully recognize and appreciate the concepts of the invention pertaining thereto. Turning now therefore specifically to FIG. 1, there will be seen the elevator construction of the invention, illustrated by way of example, and comprising an endless conveyor member 1 at which there are secured a plurality of entrainment elements 2. The entrainment elements 2 are connected with the conveyor member 1 in symmetrical relationship with respect thereto, at a substantially uniform spacing from one another and in a rather dense arrangement. Further, this conveyor member 1 is moved without slippage in the direction of both arrows D, $D_1$ through the agency of a suitable rotatable drive wheel or gear 4 and an adjustably arranged, resiliently-biased deflecting bracket or conveyor member-turning element 5. It will be appreciated that the rotatable drive gear or wheel 4 is seated upon a rotatable shaft member 6 which, in turn, is coupled in driving relationship to any suitable, and therefore non-illustrated drive mechanism.

It will understood that the conveyor member 1, forms in the conveying plane, a first run 7 which ascends in the material conveying direction D and a second run 8 which descends in the opposite direction $D_1$. The ascending run 1 of the conveying member 1 is enclosed by an associated conveying chute or shaft 11 while the descending run 8 is enclosed by a return chute or shaft 12. The internal cross-sectional area of these shafts 11, 12 is only slightly larger than the outer cross-sectional area of the entrainment elements 2. Also, it will be seen that the upper portion of the elevator construction is covered by a material ejection hood member 13 having a portion which extends at an inclination downwardly away from the return chute or shaft 12 and at the end of which there is flanged an ejection pipe or conduit 14.

FIG. 2 illustrates quite clearly that the entrainment elements 2, also viewed in the direction of the conveying plane, are suspended symmetrically with respect to each run 7,8 of the conveyor member 1. This figure additionally illustrates that the width F of the ejection hood member 13, measured in the direction of the shaft member 6, is almost twice as large as the width of the conveying shaft or chute 11.

Details of the entrainment members have been shown in FIGS. 3 and 4, FIG. 3 being a top plan view of one entrainment member and FIG. 4 a perspective view thereof. Now, as best seen from these figures, each entrainment member or element 2 is in the form of a scoop funnel which is open at both its top and bottom end and has the center of gravity indicated at location 22. Further, each such entrainment element 2 is bounded by a peripheral wall 19, the upper peripheral end of which, viewed in the conveying direction D, is larger than the lower end thereof. The peripheral wall 19 approximately possesses the configuration of a hollow truncated pyramid which has been inverted, and which has a substantially oval- or elliptical-shaped cross-sectional configuration, with the tapered sides of such pyramid construction extending at an angle of about 20° towards the lengthwise axis thereof. The end face 21 of each bucket-like entrainment element 2 open at opposite ends, and which end face extends furthest towards the outside when the entrainment elements are mounted at the conveyor member 1 will also been seen to extend approximately parallel to the major axis of the elliptical cross-section.

Now, the side of each entrainment element 2 located opposite the scooping side or end 21 will be seen to have the peripheral wall 19 thereof directed inwardly past the center of gravity 22 into the internal region or space of the scooping or bucket funnel-like entrainment element 2, and therefore forms a trough or funnel 23 which is continuous and open at its upper and lower end, as best shown to referring to FIG. 4. This trough 23, again as clearly shown by referring to FIG. 4, is bounded by the roof-like inclined trough walls 25, 25'. At the location of the trough wall 25' which is furthest directed inwardly of the corresponding entrainment element 2, there is provided within such entrainment element 2 a substantially roof-shaped reinforcement member 24. This reinforcement member 24 is connected at its other end with the scooping or bucket side 21 of the peripheral wall 19. The planes of symmetry of the trough 23 and the reinforcement 24 both coincide with the plane of symmetry of the entire scoop-like funnel-shaped entrainment element 2. Now, within or in this common plane of symmetry, there is disposed the center of gravity axis or line 20 which extends parallel to the conveying direction D and through the center of gravity 22. Moreover, at both of the side walls 25 of the trough 23 there are advantageously provided means for the detachable connection of each of the funnel-shaped entrainment elements 2 with the conveyor member 1, as will be more fully explained hereinafter.

By referring now specifically to FIG. 5, it will be seen that the conveyor member 1 is constituted by an endless link chain assembled from similar chain links 16, 16'. Each two neighboring chain links 16, 16' are articulated to one another by means of a chain pivot bolt 17 secured against axial displacement and which engages into the intermediate space 9 formed between both runs 7,8 of the conveying member 1. Now at each chain link 16, 16' of the link chain construction there is detachably suspended at the center of gravity 22 one such entrainment element 2 as previously described heretofore.

Having now had the benefit of the foregoing general discussion of the preferred embodiment of inventive elevator, its mode of operation will now be considered and is as follows: the conveying operation is composed of the various partial operations which occur simultaneously at different locations of the elevator, namely: the scooping up of the material to be conveyed, the upward transport of such material, the ejection of the conveyed material and the return of the empty entrainment elements.

Considering first the scooping up or charging of the bucket-like entrainment elements with the material such occurs at the bottom region or base of the elevator, indicated generally at location 100 and which bottom region or base is immersed in the bottom cabinet or box of the structure. The entrainment elements 2 immerse by means of the scoop side or end 21 of their peripheral wall 19 into the poured layer of material located at the base of the equipment and then convey such in the direction of movement of the entrainment elements. The scooping action is supported by virtue of the inclination of the peripheral wall 19 of each of the entrainment elements 2 at the scoop side 21 thereof. Furthermore, the compact or dense sequential arrangement of the entrainment elements 2 ensures for effective utilization of the existing space.

The upward transport of conveying of the scooped material occurs within the confines of the conveying or transport shaft 11 in which the conveyed material forms a so-called lifting column which continuously wanders or travels in the conveying direction. The actual transportation of the material takes place due to the cooperation of the pressure differential $\Delta P$ formed between both open ends of the conveying shaft or chute 11 and the supporting action of all of the inclined inner surfaces of the entrainment elements 2. Upon fulfilling certain minimum requirements, the formation of the lifting column considered heretofore proceeds in a stationary fashion: the disintegrating portion of the lifting column leaving the upper end of the conveyor chute 11 is continuously replenished at the lower end of the equipment owing to the scooping-action performed by the entrainment elements 2 at the bottom cabinet or housing.

The scooping funnel-like material entrainment elements 2 which are open at the lower end contribute towards rendering uniform the travelling lifting column since they do not possess any bottoms or floors which would hinder vertical distribution of the conveyed material.

Of decisive importance is the fact that the peripheral or circumferential wall 19 of each entrainment element 2 which widens upwardly in the material conveying direction D prevents in stripper-like fashion the formation of a boundary layer at the inner wall of the conveyor or transport shaft 11 formed from transported material. Therefore, the lifting column formed by the conveyed material remains unchanged during the upward conveying movement, and no appreciable velocity-, density- and pressure gradient exists between the marginal region and the central region of its cross-section. Hence, the frictional forces at the wall region of the equipment and the side effects oftentimes disadvantageously existing because of such wall friction are reduced to a minimum.

Now, the ejection of the upwardly conveyed material occurs within the ejection or discharge hood 13 of the elevator, at which location the conveyed material is separated from the entrainment elements 2 themselves. This separation is favored owing to the inertia forces acting upon the entrained material, which inertia forces increase quite markedly with increasing conveying velocity or speed.

As best recognized by referring to FIG. 6, the scooping funnel-like entrainment elements 2 which are open at both the top and bottom enable the conveyed material to follow its inertia paths and to escape or depart with minimum hindrance. The conveyed material can follow the inertia paths quite early, namely at the beginning of such time that the material is deflected or turned whereby the inertia paths extend essentially tangentially with respect to the drive wheel or gear 4 and such conveyed material can shoot out through the openings of the leading funnel-like entrainment element 2. In the stationary case, the ejection of the material therefore extends over a larger angular range, and specifically, also during rapid successive following of the funnel-like entrainment elements 2 as such would be the case if the entrainment elements are arranged densely next to one another at the conveying member and/or during high conveying velocities.

The described widening of the ejection cone is effectively supported owing to the inclination of the peripheral wall 19 of the entrainment elements 2 at all sides. As indicated in FIG. 7, the peripheral wall 19 acting as a slide surface for the material deflects the transported material such that the ejection cone is also perpendicular to the conveying plane, that is, is widened in the direction of the shaft member 6. In this regard, a further advantage of the described elevator is of importance. The extension or engagement of the entrainment elements 2 into the intermediate space or area 9 between both of the runs 7,8 of the conveyor member 1 renders it possible to arrange such runs 7,8 closer to one another than otherwise possible in elevator constructions of the prior art. As a result, there is increased in desired fashion the difference in the centrifugal accelerations to which the individual particles of the conveyed material are subjected during deflection. This means that the particles of the conveyed material bearing against the scooping side or end 21 of the entrainment elements 2 are ejected earlier and move through the steeper paths than the material particles at the opposite side.

The absence of a floor or bottom at the scooping funnel-like conveyor elements 2, the inclination of the peripheral wall 19 and the engagement of the entrainment elements 2 into the intermediate compartment 9 cooperate in the same sense with one another. The widening of the ejection cone increases the degree of emptying while at the same time providing for increased protective handling of the ejected material. As a result, when working with the equipment of the invention, the material particles tend to collide much less with one another. Owing to this last-mentioned result, the percentage of damaged material is reduced to a minimum, also during high conveying speeds, and the field of application of the elevator is widened to encompass even structurally-delicate materials to be transported.

The widened ejection cone of the described elevator of the invention constructively also can be realized by virtue of the fact that the width F of the ejection hood member 13 measured in the direction of the shaft 6 of the drive wheel or gear 4 is almost twice as large as the width of the conveyor shaft or chute 11. On the other hand, it is possible to reduce the width of the ejection hood member 13 measured in the conveying plane in relation to comparable elevators, so that overall there results a reduction in the weight and spatial requirements and there is attained a compactor structure which is less mechanically delicate.

The spatial requirements and the weight of the elevator are also decisively influenced in that the entrainment elements 2 thereof extend into the previously unused intermediate space 9 between both runs 7,8 of the conveying member 1. In the optimum situation realized in the described installation, the entrainment element 2 has one-half thereof located outside of the conveyor run and the other half between both conveyor runs 7,8, as best observed by referring to FIGS. 1 and 6. As a result, the weight of the entrainment elements 2 and the conveyed material transported thereby is simultaneously ideally distributed. This is not only statically important, rather above all also of extreme significance dynamically.

When the entrainment elements 2 are suspended at the center of gravity, the moment of inertia thereof and therefore also that of the completely assembled conveyor member 1 is reduced to a minimum value. The energy and space requirements simultaneously drop. The slight or low moment of inertia loads the conveyor member less and that is also true with regard to its support construction, which is noticeable in terms of greater quietness in operation with less chain pull.

Furthermore, the simultaneously reduced natural oscillations of the individual entrainment elements 2, as well as the conveyor runs 7 and 8, render it possible to reduce the safety factors and to operate during continuous operation with the maximum permissible conveying speeds. Additionally, the wall thickness of the entrainment elements 2 — at least at the side of attachment thereof — can be designed to be less owing to their reduced cantilever. Under remaining constant conditions and loads, the weight-, energy- and spatial requirements can be simultaneously reduced and greater conveying heights achieved. This is of significance especially in the case of mobile conveying installations and conveying cranes destined to take care of ship loads.

If the economies of chain-type conveyors are considered, the wear of the chain links and the expense of replacing same become very important costs factors. It is therefore to be mentioned that the heretofore discussed structural and dynamic advantages of the described embodiment of inventive elevator, such as for instance the lower chain pull and energy requirement, all cooperate in the sense that the wear is reduced. This is not only true for the chain links 16, 16', but rather also for the other components of the elevator. The described entrainment elements, furthermore, can be fabricated from less rigid and/or specifically lighter and more inexpensive materials, such as for instance plastic, whereby the reduced bending strength or stiffness can be locally balanced out be reinforcement and/or suitable shaping of such components.

Instead of using the 20° funnel-angle considered above in conjunction with the heretofore described elevator embodiment of the invention, it would also be possible to operate with other funnel angles accommodated to other operating conditions or to the material to be transported. Furthermore, it is here mentioned that the external cross-section of the entrainment elements can enlarge from the bottom towards the top also in a non-linear fashion, such as by possessing a substantially curved-shape, by way of example.

Finally, it would be possible to select for the entrainment element a different cross-sectional shape, for instance a circular cross-sectional configuration. The base housing or box which has not been illustrated in FIGS. 1 and 2 for the purpose of preserving clarity in the presentation of the drawings additionally can be designed as a closed-type box at which the material to be conveyed moves directly into the entrainment elements.

While there is shown and described present preferred embodiments of the invention, it is to be distinctly understood that the invention is not limited thereto but may be otherwise variously embodied and practiced within the scope of the following claims. ACCORDINGLY,

What is claimed is:

1. An elevator, especially for the substantial vertical conveying of granular or pulverulent materials, comprising at least one endless conveying member, material-entrainment elements, means for attaching said entrainment elements to said conveying member, said conveying member together with said entrainment elements continuously moving through a material conveying path, a conveying chute means surrounding said conveying path, means for displacing said conveying member with its attached entrainment elements through said conveying path, said conveying chute means having an upper end portion, material ejector hood means disposed over said upper end portion of said conveying chute means and spaced laterally outwardly from said conveying chute means, each of said entrainment elements possessing a laterally closed substantially funnel-shaped configuration and being open at its upper and lower ends in the direction of said conveying path, the cross-sectional area of each entrainment element, viewed in the direction of conveying of the material, widening laterally to all sides, and the width of said material ejector hood means measured in a direction transverse to the direction of movement of the conveying member is considerably greater than the width of the conveying chute means.

2. The elevator as defined in claim 1, wherein each of said entrainment elements comprises an inwardly directed trough means bounded at least at three sides by the exterior surface of the laterally closed periphery of said entrainment elements.

3. The elevator as defined in claim 2, wherein a reinforcing member extends between the furthest inwardly directed side of said trough means and the adjacent oppositely situated portion of said laterally enclosed periphery of said entrainment element.

4. The elevator as defined in claim 2, wherein said reinforcement member is inclined in roof-like fashion viewed in the direction of conveying of the material.

5. The elevator as defined in claim 1, wherein said conveying member incorporates a pair of spaced conveyor runs forming therebetween an intermediate space, each of said entrainment elements being laterally bounded by a peripheral wall which at least at one location of its circumference is inwardly directed towards the interior of said funnel-shaped entrainment element for forming trough means which are continuous in the direction of conveying of the material, said attaching means for said entrainment elements cooperating at the region of said trough means for securing each said entrainment element at the interior of said trough means with said conveying member, each said entrainment element engaging into the intermediate space formed between both conveyor runs of said conveying member.

6. The elevator as defined in claim 5, wherein said trough means is substantially symmetrical with respect to its direction of return towards the interior of the corresponding entrainment element, and wherein the plane of symmetry of said trough means is located at least approximately in a symmetry plane of the entrainment element which is substantially parallel to the direction of conveying of the material.

7. The elevator as defined in claim 1, wherein the point of attachment of each entrainment element with said conveying member is located at least approximately along a line extending through the centers of gravity of said entrainment elements.

8. The elevator as defined in claim 1, wherein each entrainment element possess a peripheral wall which, viewed in the direction of conveying of the material, possesses essentially the shape of an inverted truncated pyramid.

* * * * *

UNITED STATES PATENT OFFICE
CERTIFICATE OF CORRECTION

Patent No. 3,687,272      Dated August 29, 1972

Inventor(s) EDWIN B. EISENEGGER

It is certified that error appears in the above-identified patent and that said Letters Patent are hereby corrected as shown below:

In the heading of the patent, the name of the assignee should read

--Gebruder Buhler AG--

Signed and sealed this 8th day of May 1973.

(SEAL)
Attest:

EDWARD M. FLETCHER, JR.      ROBERT GOTTSCHALK
Attesting Officer      Commissioner of Patents